UNITED STATES PATENT OFFICE.

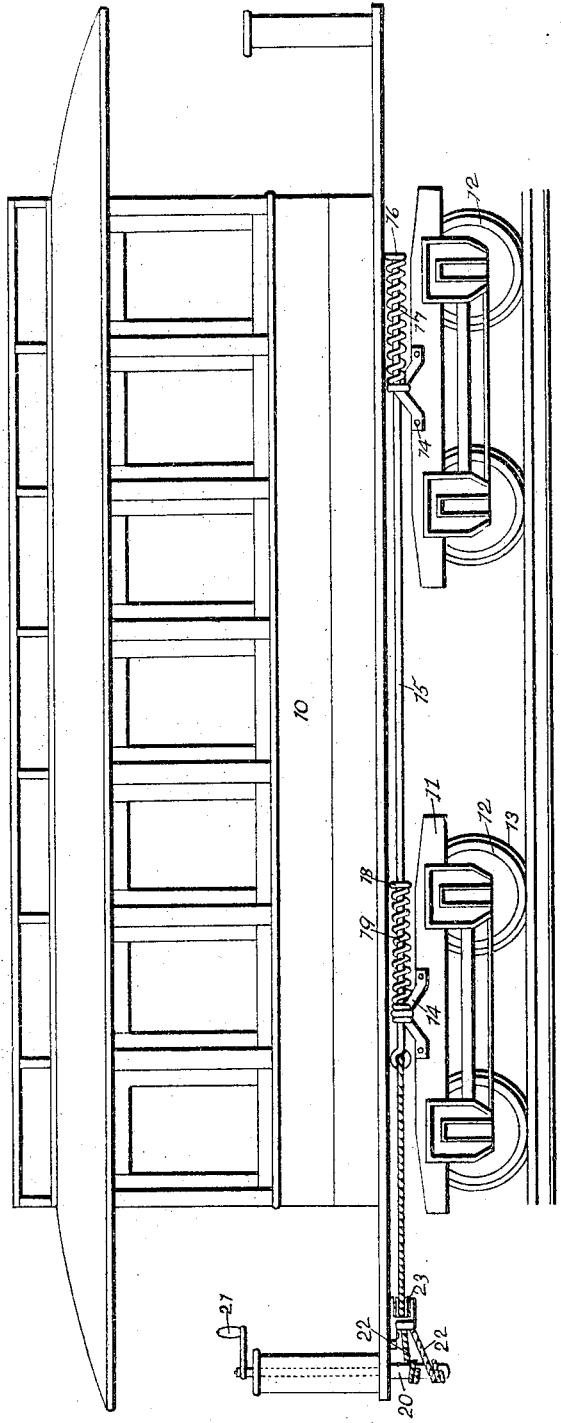

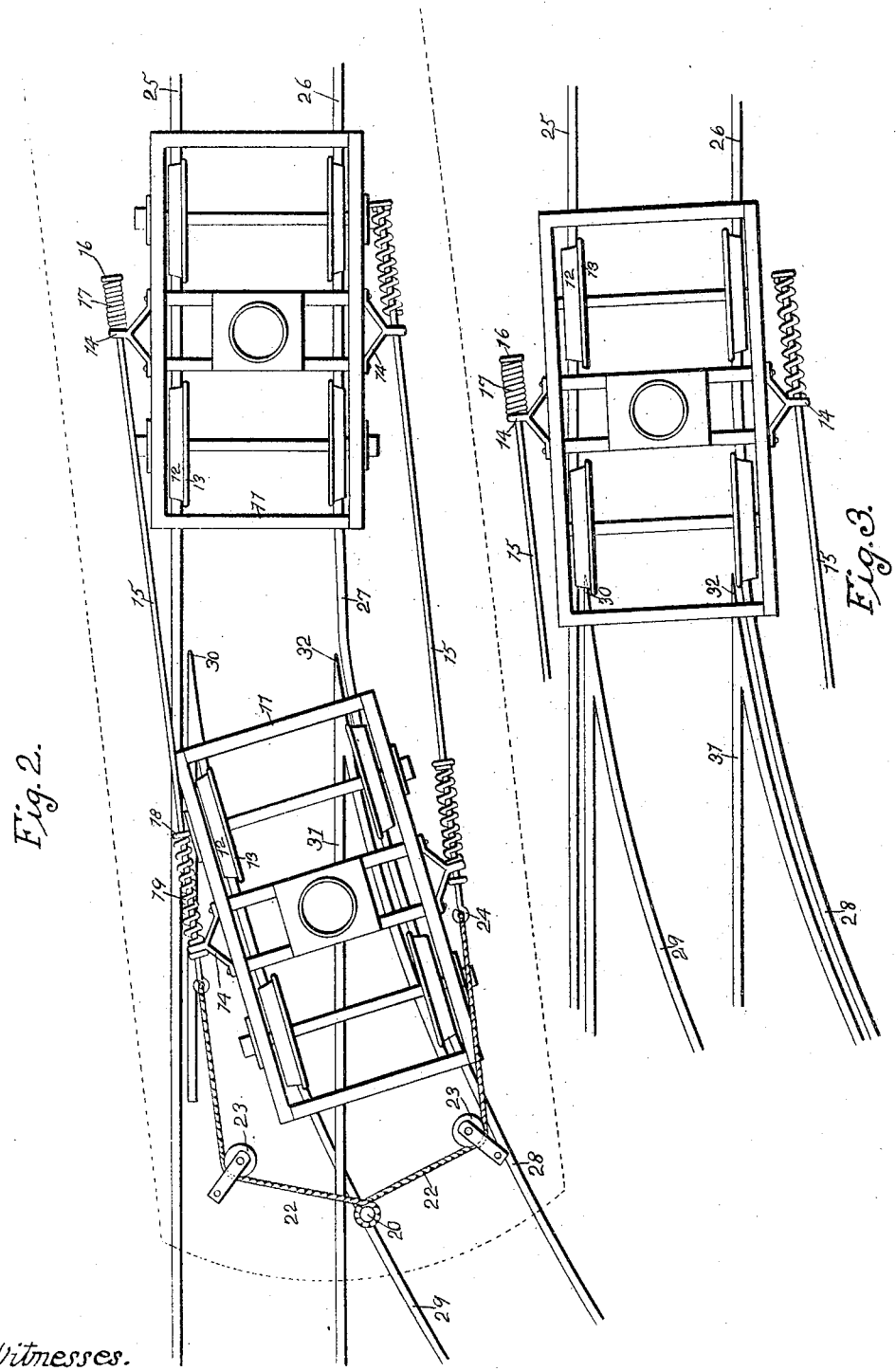

JOHN E. SWONSON, OF DES MOINES, IOWA, ASSIGNOR TO HENRY S. BUTLER, OF DES MOINES, IOWA.

CAR-SWITCHING.

No. 798,370.  Specification of Letters Patent.  Patented Aug. 29, 1905.

Application filed June 3, 1903. Serial No. 159,868.

*To all whom it may concern:*

Be it known that I, JOHN E. SWONSON, a citizen of the United States, residing at Des Moines, in the county of Polk and State of Iowa, have invented certain new and useful Improvements in Car-Switching, of which the following is a specification.

My invention relates to that class of car-switching devices in which all the parts of the rails at the branches in the tracks are immovable and so arranged that a car approaching a branch in the track may be steered or directed to either one of the tracks branching from the main track.

My objects are to provide means by which a car having swiveled trucks may be operated to pass from a main track to either one of the tracks at a branch of the main track by applying pressure to the trucks themselves to force them in the desired direction in contradistinction to devices for the same purpose in which guides carried by the car or truck are arranged to coact with guide-rails on the road-bed to force the trucks laterally.

More specifically, it is my object to provide means of simple, durable, and inexpensive construction to be set or controlled by an operator on the car by which a yielding pressure in a lateral direction may be applied to the swiveled trucks of the car in such manner that one of the rear wheels of the truck will have its flange forced against the inner face of the rail, thus forming a fulcrum upon which the entire front end of the truck is moved laterally when the car reaches a widened part of the track in front of the branch in the track, which widened part will permit such lateral movement.

My invention consists in the construction, arrangement, and combination of the various parts of the device whereby the objects contemplated are attained, as hereinafter more fully set forth, pointed out in my claims, and illustrated in the accompanying drawings, in which—

Figure 1 shows a side elevation of a car provided with my improvements. Fig. 2 shows the top or plan view of the trucks, the forward truck resting upon a curved branch of the track and the rear truck resting upon the main or straight track, the position of the car-body being indicated by dotted lines. Fig. 3 shows a top or plan view of one of the car-trucks resting upon a track, the front wheels of the truck resting upon a widened portion of the track immediately in front of a branch therein, said front wheels being set in position to travel upon the curved branch of the track.

Referring to the accompanying drawings, I have used the reference-numeral 10 to indicate the car-body. This car-body is supported upon two trucks 11, each of which is provided with four wheels 12, having flanges 13, and these trucks are swiveled to the car-body in the ordinary way, so that they may be rotated upon their swivels relative to the car-body. On each side of each truck is a bracket 14, projecting laterally from the truck, and on each side of the car is a rod 15, passed through said brackets and movable longitudinally therein. On the rear end of each rod is a head 16, and between said head and the adjacent bracket 14 is an extensile coil-spring 17, mounted upon the rod and normally engaging both the head 16 and the bracket 14. Fixed to the rod 15, near the bracket 14 of the other truck, is a collar 18, and between the collar 18 and the rear of the truck 14 is another extensile coil-spring 19, mounted upon the rod and engaging both the collar 18 and the bracket 14.

Mounted at the front of the car-body is an upright shaft 20, operated by a crank 21, and fixed to the lower end of the shaft 20 are two cables 22, wound upon the shaft 20 in opposite directions. Each of these cables 22 passes around a direction-pulley 23 on the under side of the car-body and is attached to the hook 24 at the front end of the adjacent rod 15.

From the foregoing description it is obvious that when the car is advancing over a straight track and when the shaft 20 is free to rotate the springs 17 and 19 on one side of the car will counterbalance the corresponding springs on the other side of the car, and hence they will have no effect upon the trucks. When the shaft 20 is rotated, both of the springs 17 and 19 on one side of the car will be compressed, while those on the other side will be released. Hence a yielding pressure will be exerted on both trucks in a direction tending to rotate said trucks relative to the car-body and to force the forward ends of the trucks in a direction away from the side having the compressed springs. In this connection it is to be noted that when the front truck has been turned at an angle relative to the body of the car, as would be the case when the front truck had passed from the straight track to the curved branch, as illustrated in Fig. 2, then the compressed springs bearing against the front truck will be extended and the lateral pressure upon the front trucks will be stopped without effecting the lateral pressure upon the rear trucks and without permitting the spring on the rear truck to expand.

It is to be understood that my improved car-switching device is not intended to be used in connection with tracks having switches provided with movable switch-points, as my device does not in any way tend to move such switch-points, and, furthermore, in order that my device may be sucessfully operated there must be a relatively widened portion in the track immediately in front of each branch in the track.

The arrangement of the track-rails with which my improved car-switching device works to best advantage is the one illustrated in the accompanying drawings. It comprises a straight rail 25, forming one of the rails of the track immediately in front of the branch and also one of the rails of the straight track beyond the branch. The numeral 26 indicates the other straight rail, forming, with the rail 25, the straight track in front of the branch. This rail 26 is inclined at 27 away from the rail 25, thus forming a relatively widened portion in the track, and beyond the part 27 this same rail is indicated by the numeral 28 and forms one of the rail members of the curved branch track. The numeral 29 indicates the other rail member of the curved branch track, which terminates in a point at 30 a slight distance from the straight rail 25. The numeral 31 indicates the rail forming one member of the straight track beyond the switch, the rail 25 being the other member of this straight track. The end of the rail 31 terminates in a point at 32 substantially in line transversely with the point 30, and the inner face of the rail 31 is arranged in line with the inner face of the rail 26, and hence the point 32 stands a slight distance away from the inner face of the inclined part 27 of the rail 26. Obviously on a track of this kind the front wheels of a truck may be made to travel from the main track to either the straight track beyond the branch or the curved track beyond the branch by applying pressure in a lateral direction to the truck, tending to force the forward end of the truck toward the side to which it is intended that the truck be directed.

In practical use and assuming that a car provided with my improvements is running on a straight track and approaching a branch thereof and assuming, further, that it is desired to direct the car to the curved branch of the track, then the operator sets the truck-controlling mechanism in the position required for applying a yielding pressure to both trucks in a direction tending to force the forward ends thereof toward the curved branch. The wheel-flanges will of course prevent the trucks from turning so long as the trucks are on the straight track. However, when the front wheels of the front truck reach the widened portion of the track then the front truck will turn on a pivot centered at the point where the flange of the rear wheel on the side opposite from the curved branch engages the inner face of the track-rail. It would of course require a very great amount of pressure to slide the front wheels laterally upon the widened portion of the track if the car were stationary; but when the car is moving these front wheels will slide laterally the short distance required when a comparatively slight amount of pressure is applied thereto. Then when the front wheels of the truck have moved a short distance upon the curved branch the rear wheels will necessarily follow. Then when the rear truck reaches the widened portion of the track it will be effected by the pressure device in the same way as the front truck. When it is desired to direct the car toward the straight part of the branch, lateral pressure is applied in a direction tending to force the front ends of the trucks in an opposite direction, so that the flange of the front wheel on the side having the continuous straight rail will be forced close against the inner face of this rail, and the flange of the opposite front wheel will be forced as far away as possible from the inner face of the opposite rail. In this connection it is to be noted that my improvement differs materially from the means commonly employed for steering traction-engines, automobiles, &c., having the front wheel or wheels only effected by the steering mechanism, for in order to accomplish the desired results it is necessary that a truck having both front and rear wheels be used and that the pressure for steering the truck be applied in such manner that one of the rear wheels engages the track in such a way as to form a fulcrum upon which the entire truck may turn, so that both front wheels may move bodily in a lateral direction, and it is also essential that the truck or trucks be swiveled to the car-body.

Having thus described my invention, what I claim, and desire to secure by Letters Patent of the United States therefor, is—

1. An improvement in car-switching, comprising a car-body, two trucks swiveled to the car-body and means for applying yielding pressure laterally to both trucks.

2. An improvement in car-switching, comprising a car-body, two trucks swiveled to the car-body and means for applying yielding pressure in a lateral direction simultaneously to both trucks.

3. An improvement in car-switching, comprising track-rails, a car-body, a truck swiveled to the car-body, means for applying yielding pressure to the truck tending to rotate the truck relative to the body, and front and back wheels on the truck shaped to coact with the rails, one of said back wheels forming with one of the rails a fulcrum upon which the truck turns relative to the track-rails when rotated relative to the car-body.

4. The combination with track-rails, of a car, a truck swiveled to the car having front and rear wheels, means for applying yielding pressure in a lateral direction upon the truck tending to force the front end of the truck laterally, said movement centered at a point where one of the rear wheels engages the adjacent track-rail.

5. An improvement in car-switching, comprising track-rails, a car-body, a truck swiveled to the car-body and having flanged wheels, said flanges engaging the inner faces of the rails, and means carried by the car for applying yielding pressure in a lateral direction upon the truck tending to rotate the truck relative to the car-body upon its swivel, and also tending to turn the truck bodily upon a fulcrum formed by one of the wheel-flanges at the point where it engages the adjacent rail.

6. An improvement in car-switching comprising a car-body, a truck swiveled to the car-body and having front and back wheels and means for applying yielding pressure to the truck tending to rotate it relative to the car-body.

7. An improvement in car-switching comprising a car-body, a truck swiveled to the car-body having two pairs of wheels and means for applying yielding pressure to the truck tending to rotate it relative to the car-body.

8. An improvement in car-switching, comprising in combination a track having a relatively widened portion and a branch track connected therewith adjacent to the relatively widened portion, a car-body, a truck swiveled to the car-body having front and rear wheels and means for applying yielding pressure to the truck tending to rotate it relative to the car.

9. An improvement in car-switching, comprising in combination a track having a relatively widened portion, a car-body, a four-wheeled truck swiveled to the car-body and yielding pressure devices carried by the car-body designed to force the front end of the truck laterally relative to the car-body.

10. An improvement in car-switching, comprising in combination a track having a relatively widened portion and a branch track connected therewith adjacent to the widened portion, a car-body, a truck swiveled to the car-body, four flanged wheels mounted in said truck, the flanges engaging the inner faces of the track-rail and means carried by the car for applying yielding pressure to the truck in a direction tending to rotate the truck relative to the car and to move the front end of the truck bodily upon a fulcrum formed by the flange of one of the rear wheels and the adjacent track-rail.

11. An improvement in car-switching, comprising a car-body, a truck swiveled to the car-body and having front and back wheels and means for applying variable yielding pressure to the truck tending to rotate it relative to the car-body.

12. An improvement in car-switching, comprising in combination a car-body, two trucks each having front and back wheels swiveled to the car-body, arms projecting laterally from the sides of the trucks and means carried by the car for exerting yielding pressure simultaneously upon the arms on the same side of the trucks.

13. An improvement in car-switching, comprising in combination a car-body, two trucks each having front and back wheels swiveled to the car-body, arms projecting laterally from the sides of the trucks and means carried by the car for exerting variable yielding pressure simultaneously upon the arms on the same side of the trucks.

14. An improvement in car-switching, comprising a car-body, two trucks swiveled to the car-body each having front and back wheels, arms projecting laterally from the sides of the trucks, a rod on each side of the car passed through said arms, extensile coil-springs mounted on the rods to engage the arms and drafting devices attached to the rods.

15. An improvement in car-switching, comprising a car-body, two trucks swiveled to the car-body each having front and back wheels, arms projecting laterally from the sides of the trucks, a rod on each side of the car passed through said arms, extensile coil-springs mounted on the rods to engage the arms, a shaft mounted in the car-body, two cables fixed to said shaft and wound in opposite directions upon it and attached to said rods.

16. An improved car-switching device, comprising a car-body, two trucks swiveled to the car-body each having front and back wheels, arms projecting laterally from the sides of the trucks, a rod on each side of the car passed through said arms, extensile coil-springs mounted on the rods to engage the arms, drafting devices attached to the rods and a track having a relatively widened portion and a branch track connecting therewith adjacent to the widened portion coacting with the rear wheels of the trucks to form fulcrum-points upon which the trucks are moved bodily by the springs, for the purposes stated.

JOHN E. SWONSON.

Witnesses:
S. F. CHRISTY,
J. RALPH ORWIG.